(12) United States Patent
Coady et al.

(10) Patent No.: US 11,423,141 B2
(45) Date of Patent: Aug. 23, 2022

(54) INTRUDER DETECTION USING QUANTUM KEY DISTRIBUTION

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 153 days.

(21) Appl. No.: 16/786,451

(22) Filed: Feb. 10, 2020

(65) Prior Publication Data

US 2021/0248226 A1 Aug. 12, 2021

(51) Int. Cl.
*G06F 21/53* (2013.01)
*H04L 9/08* (2006.01)

(52) U.S. Cl.
CPC ............ *G06F 21/53* (2013.01); *H04L 9/0852* (2013.01); *H04L 9/0858* (2013.01); *G06F 2221/033* (2013.01)

(58) Field of Classification Search
CPC ....... G06F 21/50–556; G06F 2221/033; H04L 9/0852–0858; H04L 63/1475
See application file for complete search history.

(56) References Cited

U.S. PATENT DOCUMENTS

| | | | |
|---|---|---|---|
| 6,801,626 B1 | 10/2004 | Nambu | |
| 7,200,866 B2 | 4/2007 | Kim et al. | |
| 7,392,378 B1 | 6/2008 | Elliott | |
| 7,441,267 B1 | 10/2008 | Elliott | |
| 7,460,670 B1 | 12/2008 | Elliott | |
| 10,103,880 B2 | 10/2018 | Fu | |
| 2005/0278700 A1* | 12/2005 | Buskens | ................. G06F 9/485 717/120 |
| 2006/0059347 A1 | 3/2006 | Herz et al. | |
| 2007/0071244 A1 | 3/2007 | LaGasse | |
| 2007/0143827 A1* | 6/2007 | Nicodemus | ......... G06F 21/6218 726/2 |

(Continued)

FOREIGN PATENT DOCUMENTS

| | | |
|---|---|---|
| CN | 101697512 A | 4/2010 |
| CN | 105553648 A | 5/2016 |

(Continued)

OTHER PUBLICATIONS

Odedoyin, Abiodun, et al., "A Quantum Cryptography Protocol For Access Control in Big Data," International Journal on Cryptography and Information Security, vol. 8, Issue 2, Jun. 2018, 12 pages.

(Continued)

*Primary Examiner* — Madhuri R Herzog
(74) *Attorney, Agent, or Firm* — Dority & Manning, P.A.

(57) ABSTRACT

Intruder detection using quantum key distribution is disclosed. A request for a first key for use with a first application configured to execute on a computing device is received by a quantum computing system. The request includes information that identifies the application. In response to the request, a quantum key distribution (QKD) process to generate a key is initiated. It is determined that an intruder attempted to eavesdrop on the QKD process. A message is sent to the computing device that instructs the computing device to cause the first application to implement a reduced functionality mode of the first application.

20 Claims, 10 Drawing Sheets

(56) References Cited

U.S. PATENT DOCUMENTS

| | | | | |
|---|---|---|---|---|
| 2013/0251154 A1* | 9/2013 | Tanizawa | ............. | H04L 9/0827 380/278 |
| 2014/0016779 A1* | 1/2014 | Lirakis | .................. | B82Y 10/00 380/256 |
| 2015/0372879 A1* | 12/2015 | Mori | ..................... | H04L 63/107 709/203 |
| 2016/0149700 A1* | 5/2016 | Fu | ........................ | H04L 9/0858 380/278 |
| 2016/0197723 A1 | 7/2016 | Takahashi | | |
| 2018/0309571 A1* | 10/2018 | Arora | .................... | H04L 9/0858 |
| 2019/0149327 A1* | 5/2019 | Yuan | .................... | H04L 9/0852 380/255 |

FOREIGN PATENT DOCUMENTS

| | | |
|---|---|---|
| CN | 108847939 A | 11/2018 |
| CN | 109194479 A | 1/2019 |
| CN | 109286443 A | 1/2019 |
| EP | 3783832 A1 | 2/2021 |
| JP | 2002118545 A | 4/2002 |
| WO | 2020177848 A1 | 9/2020 |

OTHER PUBLICATIONS

Tysowksi, Plotr, et al., "The Engineering of a Scalable Multi-Site Communications System Utilizing Quantum Key Distribution (QKD)," Dec. 2017, 34 pages.

Notice of Allowance and Examiner—Initiated Interview Summary for U.S. Appl. No. 16/592,878, dated Oct. 14, 2021, 17 pages.

\* cited by examiner

INTRUDER DETECTION USING QUANTUM KEY DISTRIBUTION

BACKGROUND

Quantum key distribution (QKD) is a secure communication method involving quantum mechanics that enables two parties to generate a random secret key that is known only to them. A property of QKD is the ability of the two communicating users to detect the presence of any third party trying to gain knowledge of the key.

SUMMARY

The examples disclosed herein implement a quantum security service using quantum key distribution to detect intruders in an environment where multiple different applications utilize keys.

In one example a method is provided. The method includes receiving, by a quantum computing system from a computing device, a request for a key for use with a first application configured to execute on the computing device, the request including information that identifies the first application. The method further includes, in response to the request, initiating a quantum key distribution (QKD) process to generate the key. The method further includes determining that an intruder attempted to eavesdrop on the QKD process. The method further includes sending, to the computing device, a message that instructs the computing device to cause the first application to implement a reduced functionality mode of the first application.

In another example a quantum computing system is provided. The quantum computing system includes a memory, and a processor device coupled to the memory. The processor device is to receive, from a computing device, a request for a key for use with a first application configured to execute on the computing device, the request including information that identifies the first application. The processor device is further to, in response to the request, initiating a quantum key distribution (QKD) process to generate the key. The processor device is further to determine that an intruder attempted to eavesdrop on the QKD process. The processor device is further to send, to the computing device, a message that an attempt has been made by an intruder to discern the key.

In another example a computer program product is provided. The computer program product is stored on a non-transitory computer-readable storage medium and includes instructions to cause a processor device to receive, by a quantum computing system from a computing device, a request for a key for use with a first application configured to execute on the computing device, the request including information that identifies the first application. The instructions further cause the processor device to, in response to the request, initiate a quantum key distribution (QKD) process to generate the key. The instructions further cause the processor device to determine that an intruder attempted to eavesdrop on the QKD process. The instructions further cause the processor device to send, to the computing device, a message that instructs the computing device to cause the first application to implement a reduced functionality mode of the first application.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
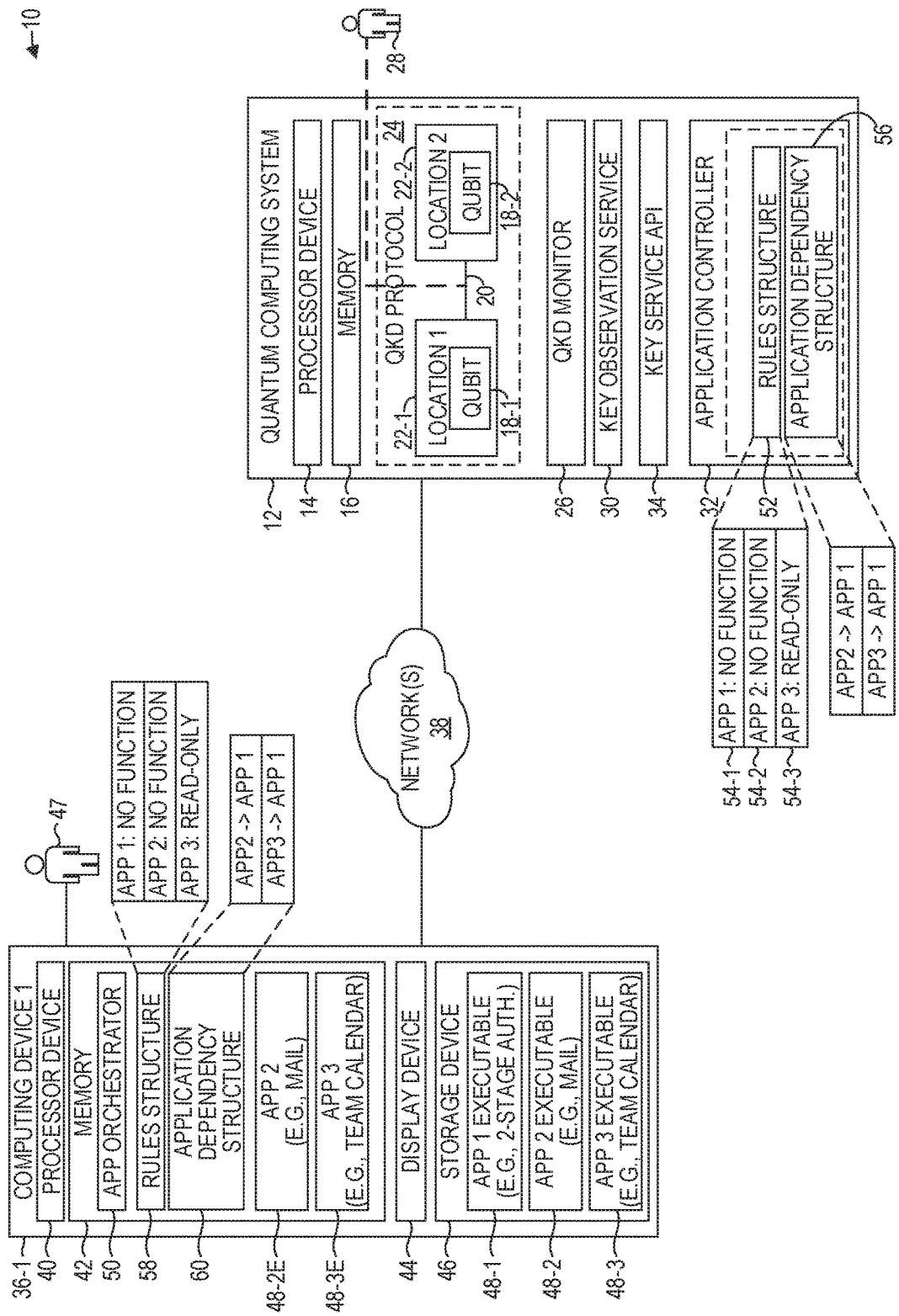
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum key distribution (QKD) is a secure communication method involving quantum mechanics that enables two parties to generate a random secret key that is known only to them. A property of QKD is the ability of the two communicating users to detect the presence of any third party trying to gain knowledge of the key.

Applications that execute on computing devices often utilize a key for encrypting and/or decrypting information. Encryption can be utilized in any number of different ways, including, by way of non-limiting example, for establishing secure communications between components, for storing and accessing data securely, or for any other number of reasons.

In some computing environments, such as enterprise (i.e., business) computing environments where multiple different applications may be executing on multiple different devices and servers, when it is determined that an intruder has, or is attempting to, access a key that is being generated, it is unknown exactly which application is the target of the intruder. It may be prudent in such a situation to temporarily pause, terminate, or otherwise inhibit access to all of the applications until all keys used by all the applications are regenerated. However, this can be disruptive to users of the enterprise environment.

The examples disclosed herein implement a quantum security service using quantum key distribution in an environment, such as an enterprise environment, where multiple different applications utilize keys. The quantum security service, utilizing quantum key distribution, generates a key for an identified application upon request. The quantum security service monitors the quantum key distribution process and is capable of detecting an intruder who eavesdrops on the quantum communication channel used by the quantum key distribution process. Upon detection of an eavesdropper, the quantum security service determines the application for which the key was destined, and causes such application to implement a reduced functionality mode until additional analysis can be performed to ensure the application has not been breached by the intruder. After appropriate analysis and actions have been taken, the application can be returned to a full functionality mode. Among other advantages, the examples disclosed herein ensure that applications that are not the target of an intruder are not shut down or otherwise impacted so that users can continue to utilize the applications that are not the target of the intruder.

FIG. 1 is a block diagram of an environment 10 in which examples disclosed herein may be practiced. The environment 10 includes a quantum computing system 12. The quantum computing system 12 includes one or more processor devices 14 and one or more memories 16. The quantum computing system 12 may be distributed among multiple different locations. The quantum computing system 12 includes a qubit 18-1, a qubit 18-2, and a quantum communication channel 20. The qubit 18-1 may be at a location 22-1, and the qubit 18-2 may be at a location 22-2. The locations 22-1 and 22-2 may be geographically distant from one another, geographically close to another, or may be the same location. As will be discussed in greater detail below, upon request, the quantum computing system 12 utilizes a quantum key distribution (QKD) protocol 24, such as, by way of non-limiting example, a BB84 QKD protocol, in conjunction with the qubits 18-1, 18-2 and the quantum communication channel 20 to generate one or more shared keys. In some embodiments, the QKD protocol 24 may be accessed via an application programming interface (API).

During a QKD process, a QKD monitor 26 monitors the QKD process to detect whether an intruder 28 is eavesdropping on the quantum communication channel 20. Upon detection of the intruder 28, the QKD monitor 26 notifies a key observation service 30. An application controller 32 registers with the key observation service 30 for notifications regarding the detection of any intruders 28 during the QKD process. A key service application programming interface (API) 34 may be invoked by a computing device to initiate a QKD process and receive a key.

The environment 10 includes a computing device 36-1 that is configured to communicate with the quantum computing system 12 via one or more networks 38. The computing device 36-1 includes a processor device 40, a memory 42, and is communicatively coupled to a display device 44 and a storage device 46. In this example, the computing device 36-1 executes, upon request from a user 47, one or more enterprise applications 48-1-48-3 associated with an employer of the user 47, each of which utilizes a key during execution. Each of the enterprise applications 48-1-48-3 has a full functionality mode and at least one reduced functionality mode. A reduced functionality mode may, for example, comprise a read-only mode, or some other limitation in functionality that may be deemed relatively safe even if an intruder is attempting to hack or otherwise compromise the application. For some applications, the reduced functionality mode may be to provide no functionality at all, and to either not be initiated, or, if already executing, to be terminated.

As an example, assume that the user 47 manipulates the computing device 36-1 to request that the application 48-3, which provides access to a team calendar, be initiated. As an example, the computing device 36-1 may present to the user 47 a plurality of icons on the display device 44, wherein each icon corresponds to a different application 48-1-48-3. The user 47 selects the icon that corresponds to the application 48-3. An application ("APP") orchestrator 50 receives the request and invokes the key service API 34 to generate a key for the application 48-3. The application orchestrator 50 may pass information, such as an application identifier that identifies the application 48-3, to the key service API 34. The key service API 34 initiates a QKD process to generate a key. The QKD monitor 26 monitors the QKD process to determine whether an intruder, such as the intruder 28, is eavesdropping on the quantum communication channel 20. In this example, assume that the QKD monitor 26 determines that the intruder 28 is eavesdropping on the quantum communication channel 20. The QKD monitor 26 halts the QKD process, and notifies the key observation service 30 that the intruder 28 has been detected during the generation of a key for the application 48-3.

The key observation service 30 in turn notifies the application controller 32 that the intruder 28 attempted to eavesdrop on the quantum communication channel 20 to determine the key being generated for the application 48-3. The application controller 32 sends a message to the application orchestrator 50 that instructs the application orchestrator 50 to cause the application 48-3 to transition from a full functionality mode to a reduced functionality mode. In one implementation, the application controller 32 may access a rules structure 52 that comprises a plurality of entries 54-1-54-3, each of which identifies, for a corresponding application 48-1-48-3, a reduced functionality mode. The rules structure 52 may be predetermined and configured, for example, by an operator of the quantum computing system 12.

In this example, the application controller 32 determines that the entry 54-3 corresponds to the application 48-3, and the message to the application orchestrator 50 that instructs the application orchestrator 50 to cause the application 48-3 to transition from a full functionality mode to a reduced functionality mode instructs the application orchestrator 50 to transition the application 48-3 to a read-only functionality mode.

The application orchestrator 50 receives the message that instructs the application orchestrator 50 to cause the application 48-3 to transition from a full functionality mode to the read-only functionality mode. The application orchestrator 50 then initiates the application 48-3 as an executing application 48-3E in the memory 42 in a read-only functionality mode. As an example, the application orchestrator 50 may set an environment variable accessible to the application 48-3E to a value that corresponds to the read-only functionality mode. Upon initiating, the application 48-3E reads the environment variable, and only permits the user 47 to read the team calendar, but does not allow the user 47 to modify the team calendar.

Assume that the user 47 next manipulates the computing device 36-1 to request that the application 48-2, which provides access to the email of the user 47, be initiated. The application ("APP") orchestrator 50 receives the request, and invokes the key service API 34 to generate a key for the application 48-2. The key service API 34 initiates the QKD process to generate a key. The QKD monitor 26 monitors the QKD process to determine whether an intruder, such as the intruder 28, is eavesdropping on the quantum communication channel 20. In this example, assume that the QKD monitor 26 determines that no intruder is eavesdropping on the quantum communication channel 20. After the QKD process is complete, the key service API 34 returns the generated key to the application orchestrator 50. The application orchestrator 50 then initiates the application 48-2 as an executing application 48-2E in the memory 42 in a full functionality mode.

Assume that the user 47 next manipulates the computing device 36-1 to request that the application 48-1, which provides access to a 2-stage authentication service of the user 47, be initiated. The application ("APP") orchestrator 50 receives the request, and invokes the key service API 34 to generate a key for the application 48-1. The key service API 34 initiates the QKD process to generate a key. The QKD monitor 26 monitors the QKD process to determine whether an intruder, such as the intruder 28, is eavesdropping on the quantum communication channel 20.

In this example, assume that the QKD monitor 26 determines that the intruder 28 is eavesdropping on the quantum communication channel 20. The QKD monitor 26 halts the QKD process, and notifies the key observation service 30 that the intruder 28 has been detected during the generation of a key for the application 48-1.

The key observation service 30 in turn notifies the application controller 32 that the intruder 28 attempted to eavesdrop on the quantum communication channel 20 to determine the key being generated for the application 48-1. The application controller 32 accesses the rules structure 52 and determines that the entry 54-1 corresponds to the application 48-1, and the message to the application orchestrator 50 that instructs the application orchestrator 50 to cause the application 48-1 to transition from a full functionality mode to a no-functionality mode.

The application orchestrator 50 receives the message that instructs the application orchestrator 50 to cause the application 48-1 to transition from a full functionality mode to the no-functionality mode. Based on the instruction, the application orchestrator 50 does not initiate the application 48-1, and stores information that the application 48-1 is not to be subsequently initiated if requested. Such information may be reset by an operator after sufficient actions have been taken that the operator deems it safe to execute the application 48-1.

In some examples, the application controller 32 may also access an application dependency structure 56 that identifies dependencies among the applications 48-1-48-3. In this example, subsequent to instructing the application orchestrator 50 to cause the application 48-1 to transition from a full functionality mode to a no-functionality mode, the application controller 32 accesses the application dependency structure 56 to determine whether any other applications 48-2-48-3 have dependencies with the application 48-1. The application dependency structure 56 contains information that indicates both the applications 48-2 and 48-3 are dependent on the application 48-1. In response, the application controller 32 accesses the rules structure 52 and determines that the entry 54-2 corresponds to the application 48-2, and that the reduced functionality mode of the application 48-2 is a no-functionality mode. The application controller 32 sends the application orchestrator 50 a message that instructs the application orchestrator 50 to cause the application 48-2E to transition from a full functionality mode to a no-functionality mode. The application orchestrator 50 receives the message, and terminates the application 48-2E.

The application controller 32 accesses the rules structure 52 and determines that the entry 54-3 corresponds to the application 48-3, and that the reduced functionality mode of the application 48-3 is a read-only functionality mode. The application controller 32 sends the application orchestrator 50 a message that instructs the application orchestrator 50 to cause the application 48-3E to transition from a full functionality mode to a read-only functionality mode. The application orchestrator 50 receives the message, and determines that the application 48-3E is already in the read-only functionality mode.

In some implementations, the computing device 36-1 may have a rules structure 58 and an application dependency structure 60, in lieu of the rules structure 52 and the application dependency structure 56. In such implementation, upon determining that an intruder 28 attempted to eavesdrop on the quantum communication channel 20 during the QKD process initiated for a respective application 48-1-48-3, the application controller 32 sends the application orchestrator 50 a message that an attempt has been made by an intruder to discern the key. The message, for example, may be an instruction to the application orchestrator 50 to cause the respective application 48-1-48-3 to implement a reduced functionality mode. The application orchestrator 50 then accesses the rules structure 58 and the application dependency structure 60 and carries out the appropriate actions, as discussed above.

It is noted that because the application orchestrator 50 is a component of the computing device 36-1, functionality implemented by the application orchestrator 50 may be attributed to the computing device 36-1 generally. Moreover, in examples where the application orchestrator 50 comprises software instructions that program the processor device 40 to carry out functionality discussed herein, functionality implemented by the application orchestrator 50 may be attributed herein to the processor device 40. Similarly, because the application controller 32 is a component of the quantum computing system 12, functionality implemented by the application controller 32 may be attributed to the quantum computing system 12 generally. Moreover, in examples where the application controller 32 comprises software instructions that program the processor device 14 to carry out functionality discussed herein, functionality implemented by the application controller 32 may be attributed herein to the processor device 14.

Figure 2:
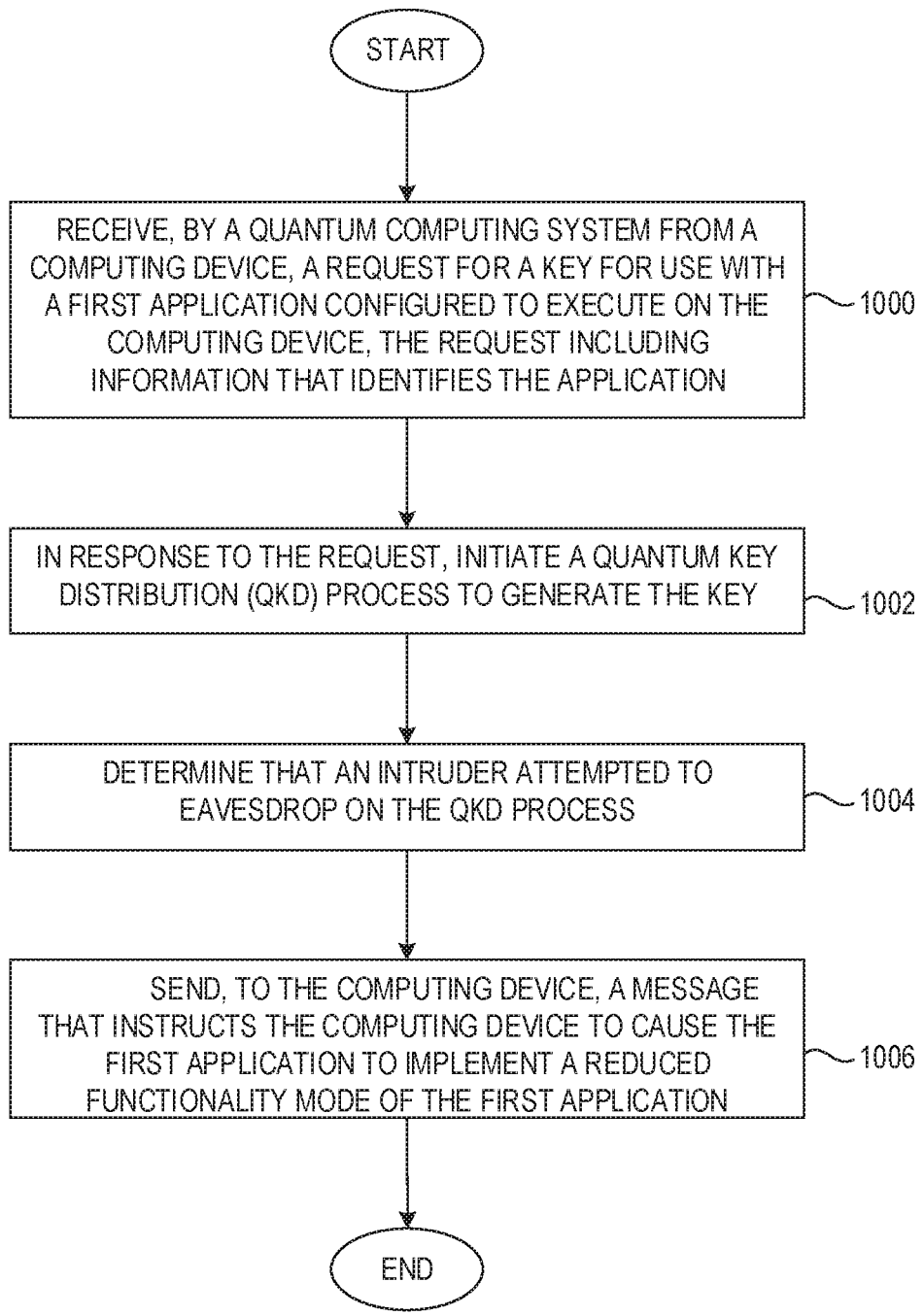
FIG. 2 is a flowchart of a method for intruder detection using quantum key distribution according to one implementation.

FIG. 2 is a flowchart of a method for intruder detection using quantum key distribution from the perspective of the quantum computing system 12 according to one implementation. FIG. 2 will be discussed in conjunction with FIG. 1. The quantum computing system 12 receives from the computing device 36-1 a request for a key for use with an application 48-1-48-3 configured to execute on the computing device 36-1, the request including information that identifies the application 48-1-48-3 (FIG. 2, block 1000). In response to the request, the quantum computing system 12 initiates a quantum key distribution (QKD) process to generate a key (FIG. 2, block 1002). The quantum computing system 12 determines that an intruder attempted to eavesdrop on the QKD process (FIG. 2, block 1004). The quantum computing system 12 sends a message to the computing device 36-1 that instructs the computing device 36-1 to cause the application 48-1-48-3 to implement a reduced functionality mode of the application 48-1-48-3 (FIG. 2, block 1006).

Figure 3:
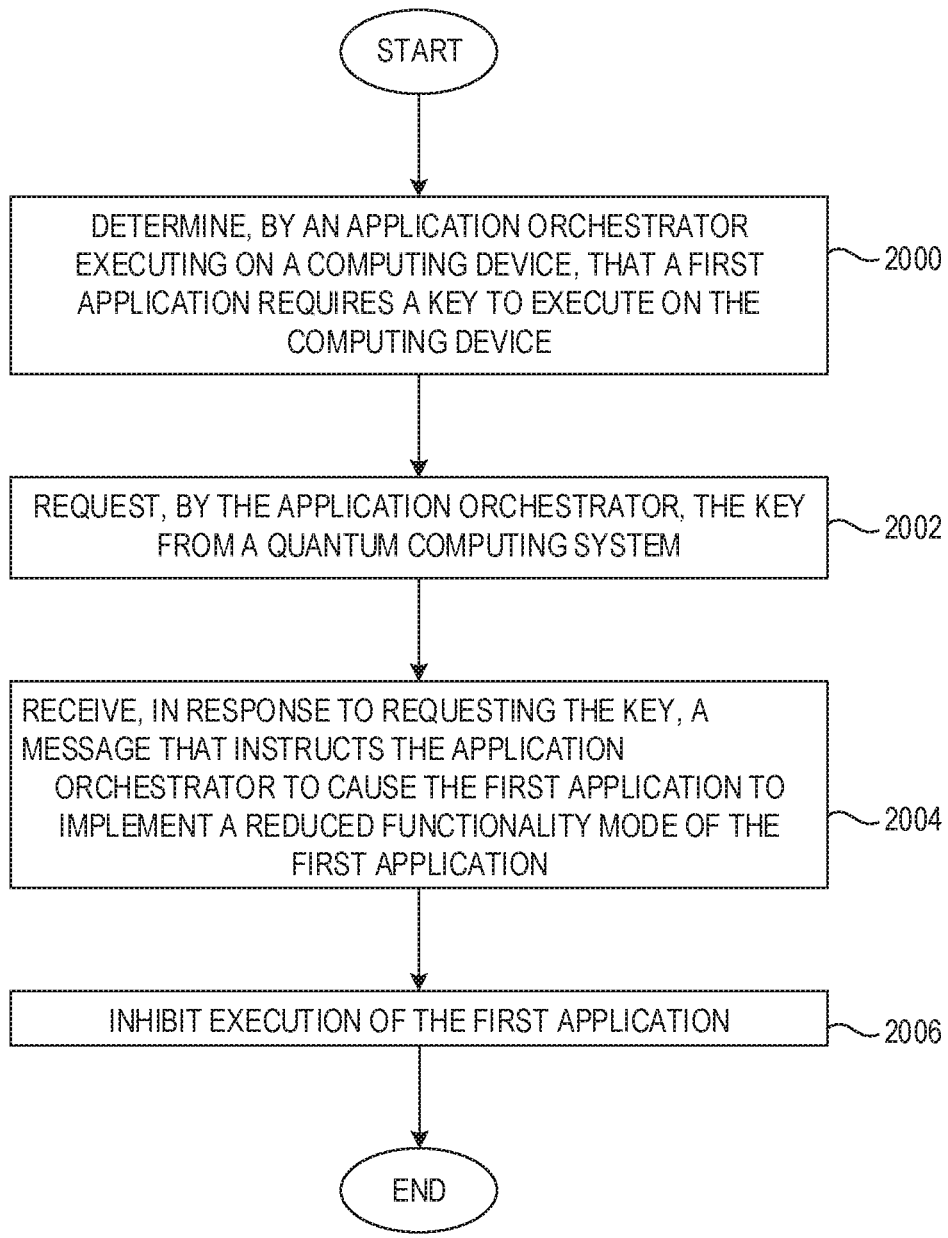
FIG. 3 is a flowchart of a method for intruder detection using quantum key distribution according to another implementation.

FIG. 3 is a flowchart of a method for intruder detection using quantum key distribution from the perspective of the computing device 36-1 according to one implementation. FIG. 3 will be discussed in conjunction with FIG. 1.

The computing device 36-1 determines that an application 48-1-48-3 requires a key for execution on the computing device 36-1 (FIG. 3, block 2000). The computing device 36-1 requests the key from the quantum computing system 12 (FIG. 3, block 2002). The computing device 36-1 receives, in response to requesting the key, a message that instructs the computing device 36-1 to cause the application 48-1-48-3 to implement a reduced functionality mode of the application 48-1-48-3 (FIG. 3, block 2006). The computing device 36-1 inhibits execution of the application 48-1-48-3 (FIG. 3, block 2008).

Figure 4:
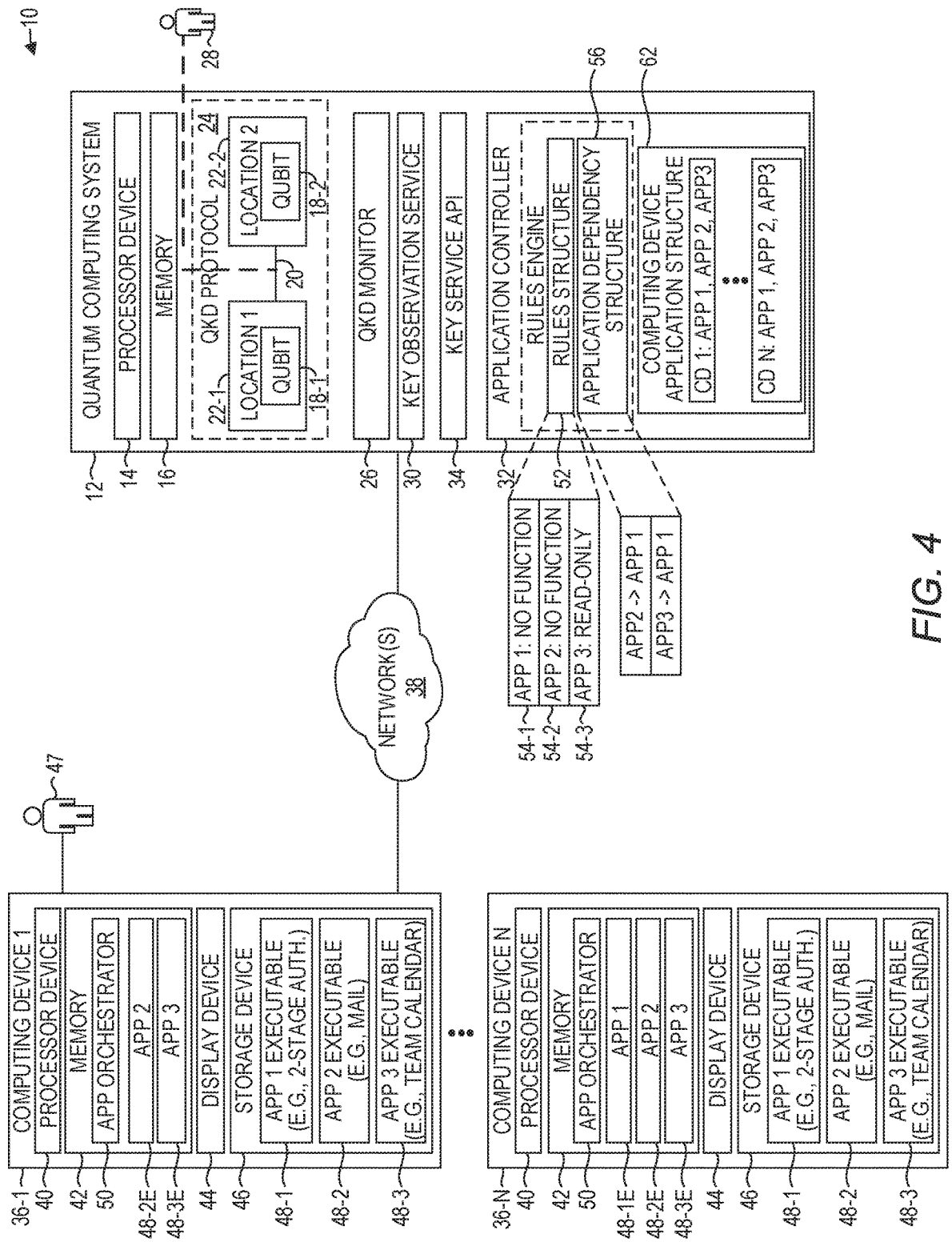
FIG. 4 is a block diagram of the environment illustrated in FIG. 1 according to another implementation.

FIG. 4 is a block diagram of the environment 10 according to another implementation. In this implementation, a plurality of computing devices 36-1-36-N each include an application orchestrator 50, and applications 48-1-48-N, and utilize the quantum computing system 12 to generate keys. In this implementation, the quantum computing system 12 maintains a computing device application structure 62 that identifies, for each respective computing device 36-1-36-N, which applications 48-1-48-3 the respective computing device 36-1-36-N is configured to execute.

For purposes of illustration, assume that, as discussed above, the application orchestrator 50 receives a request from the user 47 to initiate the application 48-1, and in response to the request, invokes the key service API 34 to generate a key for the application 48-1. The key service API 34 initiates the QKD process to generate a key. The QKD monitor 26 monitors the QKD process to determine whether an intruder, such as the intruder 28, is eavesdropping on the quantum communication channel 20. The QKD monitor 26 determines that the intruder 28 is eavesdrop on the quantum communication channel 20. The QKD monitor 26 halts the QKD process, and notifies the key observation service 30 that the intruder 28 has been detected during the generation of a key for the application 48-1. The key observation service 30 in turn notifies the application controller 32 that the intruder 28 attempted to eavesdropping on the quantum communication channel 20 to determine the key being generated for the application 48-1. The application controller 32 accesses the rules structure 52 and determines that the entry 54-1 corresponds to the application 48-1, and sends a message to the application orchestrator 50 of the computing device 36-1 that instructs the application orchestrator 50 to cause the application 48-1 to transition from a full functionality mode to a no-functionality mode. The application orchestrator 50 receives the message and prevents initiation of the application 48-1 on the computing device 36-1.

The application controller 32 also accesses the computing device application structure 62 and determines that the computing device 36-N is also configured to execute the application 48-1. The application controller 32 then sends a message to the computing device 36-N that instructs the computing device 36-N cause the application 48-1 to implement a reduced functionality mode of the application 48-1. The application orchestrator 50 of the computing device 36-N receives the message, and determines that the application 48-1E is executing on the computing device 36-N. The application orchestrator 50 then causes the application 48-1E to terminate.

Figure 5:
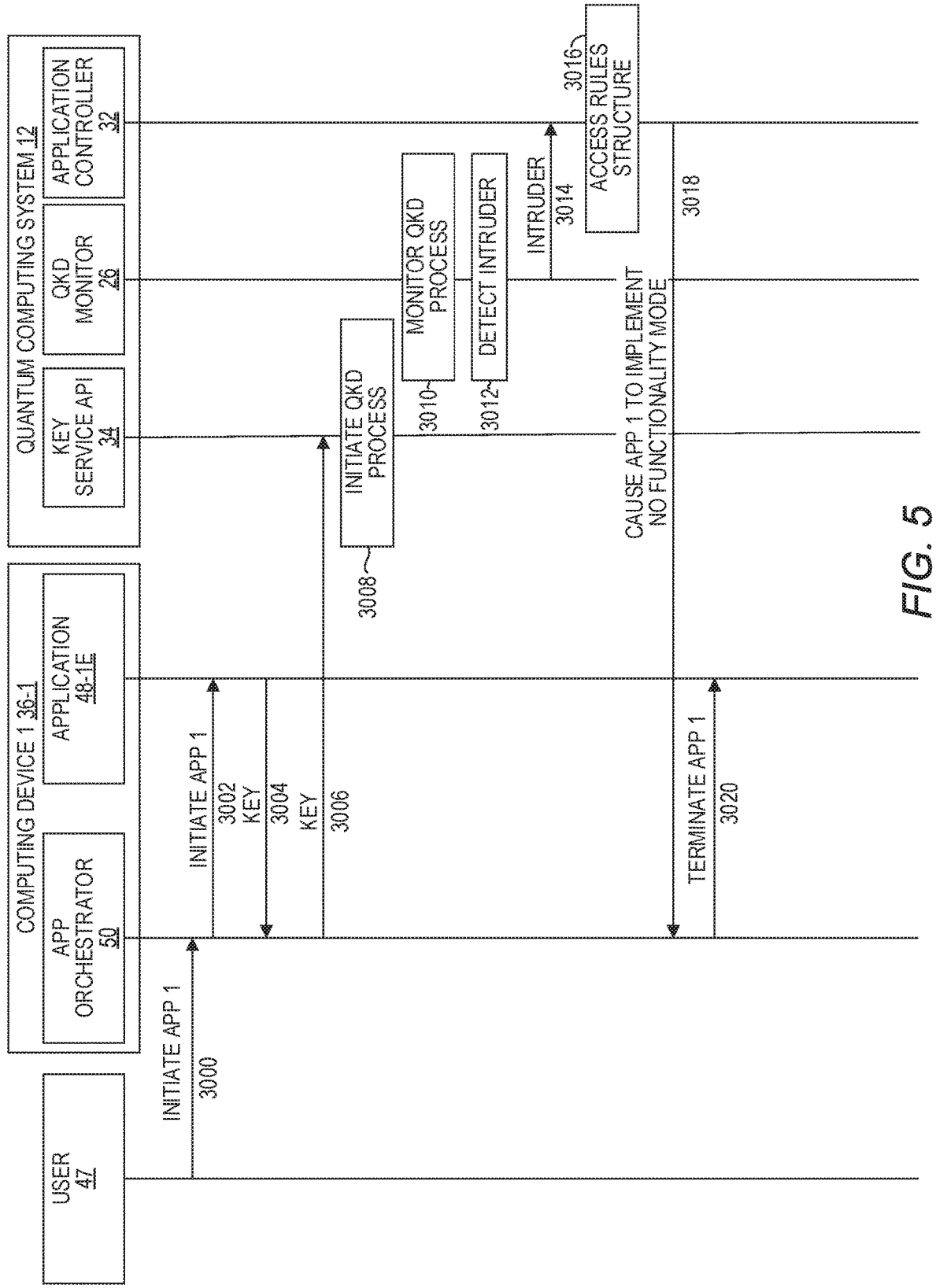
FIG. 5 is a message sequence diagram illustrating messages and actions taken by various components while implementing intruder detection using quantum key distribution according to another implementation.

FIG. 5 is a message sequence diagram illustrating messages and actions taken by various components while implementing intruder detection using quantum key distribution according to another implementation. In this example, the user 47 requests that the application 48-1 be initiated on the computing device 36-1 (FIG. 5, step 3000). The application orchestrator 50 receives the request, and initiates the application 48-1 as an executing application 48-1E in a full functionality mode (FIG. 5, step 3002). During the course of executing, the application 48-1 determines that a key is needed for an encryption task, and sends a request for a key to the application orchestrator 50 (FIG. 5, step 3004). In alternative implementations, the application 48-1 may send the request for the key directly to the quantum computing system 12 via the key service API 34.

The application orchestrator 50 sends, to the key service API 34 of the quantum computing system 12, a request for a key (FIG. 5, step 3006). The key service API 34 initiates the QKD process (FIG. 5, step 3008). The QKD monitor 26 monitors the QKD process to detect an intruder (FIG. 5, step 3010). The QKD monitor 26 detects the intruder 28 eavesdropping on the quantum computing channel used in the QKD process (FIG. 5, step 3012). The QKD monitor 26 directly, or via the key observation service 30 (not illustrated), informs the application controller 32 that an intruder was detected during the generation of a key for the application 48-1 (FIG. 5, step 3014). The application controller 32 accesses the rules structure 52 and determines that the entry 54-1 corresponds to the application 48-1, and that the reduced functionality mode for the application 48-1 is no functionality (FIG. 5, step 3016). The application controller 32 sends a message to the application orchestrator 50 that instructs the application orchestrator 50 to cause the application 48-1E to implement a no functionality mode (FIG. 5, step 3018). The application orchestrator 50 receives the message and causes the application 48-1E to terminate (FIG. 5, step 3020).

Figure 6:
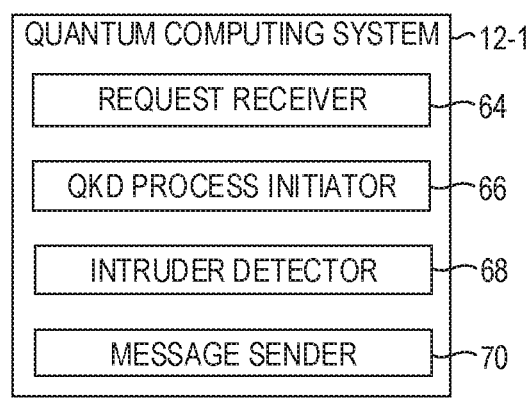
FIG. 6 is a block diagram of a quantum computing system according to another implementation.

FIG. 6 is a block diagram of a quantum computing system 12-1 according to another implementation. The quantum computing system 12-1 implements identical functionality as that described above with regard to the quantum computing system 12. The quantum computing system 12-1 includes a request receiver 64 that is configured to receive, from a computing device, a request for a key for use with a first application that is to execute on the computing device, the request including information that identifies the first application. The request receiver 64 may comprise executable software instructions configured to program a processor device to implement the functionality of receiving, from a computing device, a request for a key for use with a first application configured to execute on the computing device, may comprise circuitry including, by way of non-limiting example, an application-specific integrated circuit (ASIC), field-programmable gate array (FPGA), or may comprise a combination of executable software instructions and circuitry. In some implementations, the request receiver 64 may comprise any API function invocable from a computing device. The API function may include a parameter list via which the computing device can include an application identifier that identifies the application for which the key is being generated.

The quantum computing system 12-1 also includes a QKD process initiator 66 that is to initiate a QKD process to generate a key in response to the request received by the request receiver 64. The QKD process initiator 66 may comprise executable software instructions configured to program a processor device to implement the functionality of initiating a QKD process to generate a key, may comprise circuitry including, by way of non-limiting example, an ASIC, FPGA, or may comprise a combination of executable software instructions and circuitry.

The quantum computing system 12-1 also includes an intruder detector 68 that is to determine that an intruder attempted to eavesdrop on the QKD process. The intruder detector 68 may comprise executable software instructions to program a processor device to implement the functionality of determining that an intruder attempted to eavesdrop on the QKD process, may comprise circuitry including, by way of non-limiting example, an ASIC, FPGA, or may comprise a combination of executable software instructions and circuitry. The particular mechanism for detecting an intruder may differ depending on the particular QKD process implemented. For example, in a BB84 QKD process, the presence of an eavesdropper can be detected by examining the photons for which the different locations 22-1, 22-2 chose different bases for measurement.

The quantum computing system 12-1 also includes a message sender 70 that is to send a message to the computing device that instructs the computing device to cause the first application to implement a reduced functionality mode of the first application. The message sender 70 may comprise executable software instructions to program a processor device to implement the functionality of sending a message to the computing device that instructs the computing device to cause the first application to implement a reduced functionality mode of the first application, may comprise circuitry including, by way of non-limiting example, an ASIC, FPGA, or may comprise a combination of executable software instructions and circuitry.

Figure 7:
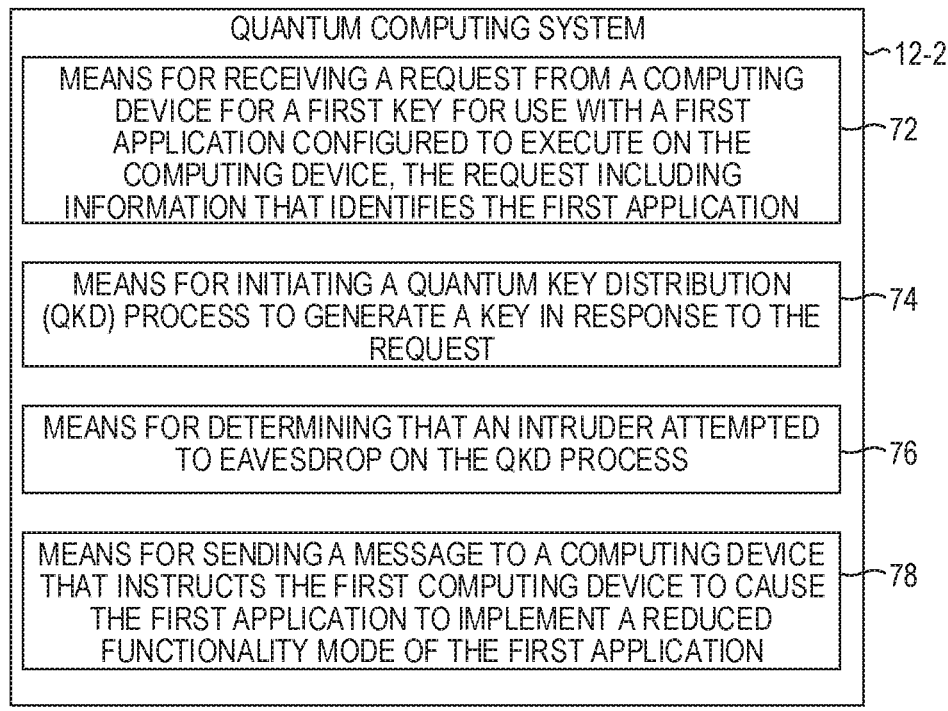
FIG. 7 is a block diagram of a quantum computing system according to additional implementations.

FIG. 7 is a block diagram of a quantum computing system 12-2 according to additional implementations. The quantum computing system 12-2 implements identical functionality as that described above with regard to the quantum computing system 12. In this implementation, the quantum computing system 12-2 includes a means 72 for receiving, from a computing device, a request for a first key for use with a first application configured to execute on the computing device, the request including information that identifies the application. The means 72 may be implemented in any number of manners, including, for example, via the request receiver 64 illustrated in FIG. 6. The means 72 may, in some implementations, comprise an API function that may be invoked by a computing device.

The quantum computing system 12-2 also includes a means 74 for initiating a quantum key distribution (QKD) process to generate a key in response to the request received via the means 72. The means 74 may be implemented in any number of manners, including, for example, via the QKD process initiator 66 illustrated in FIG. 6.

The quantum computing system 12-2 also includes a means 76 for determining that an intruder attempted to eavesdrop on the QKD process. The means 76 may be implemented in any number of manners, including, for example, via the intruder detector 68 illustrated in FIG. 6.

The quantum computing system 12-2 also includes a means 78 for sending a message to the computing device that instructs the computing device to cause the first application to implement a reduced functionality mode of the first application. The means 78 may be implemented in any number of manners, including, for example, via the message sender 70 illustrated in FIG. 6.

Figure 8:
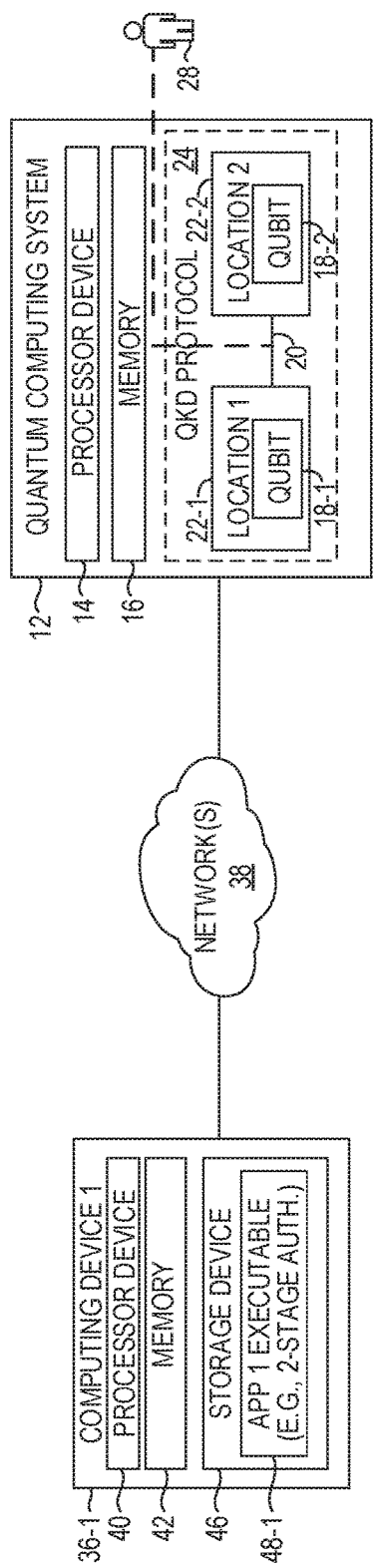
FIG. 8 is a simplified block diagram of the environment illustrated in FIG. 1 according to another implementation.

FIG. 8 is a simplified block diagram of the environment 10 according to another implementation. The quantum computing system 12 includes the memory 16 and the processor device 14 coupled to the memory 16. The processor device 14 is to receive, from the computing device 36-1, a request for a key for use with the application 48-1 configured to execute on the computing device 36-1, the request including information that identifies the application 48-1. In response to the request, the processor device 14 initiates the QKD process to generate a key. The processor device 14 determines that the intruder 28 attempted to eavesdrop on the QKD process, and sends a message to the computing device 36-1 that an attempt has been made by the intruder 28 to discern the key.

Figure 9:
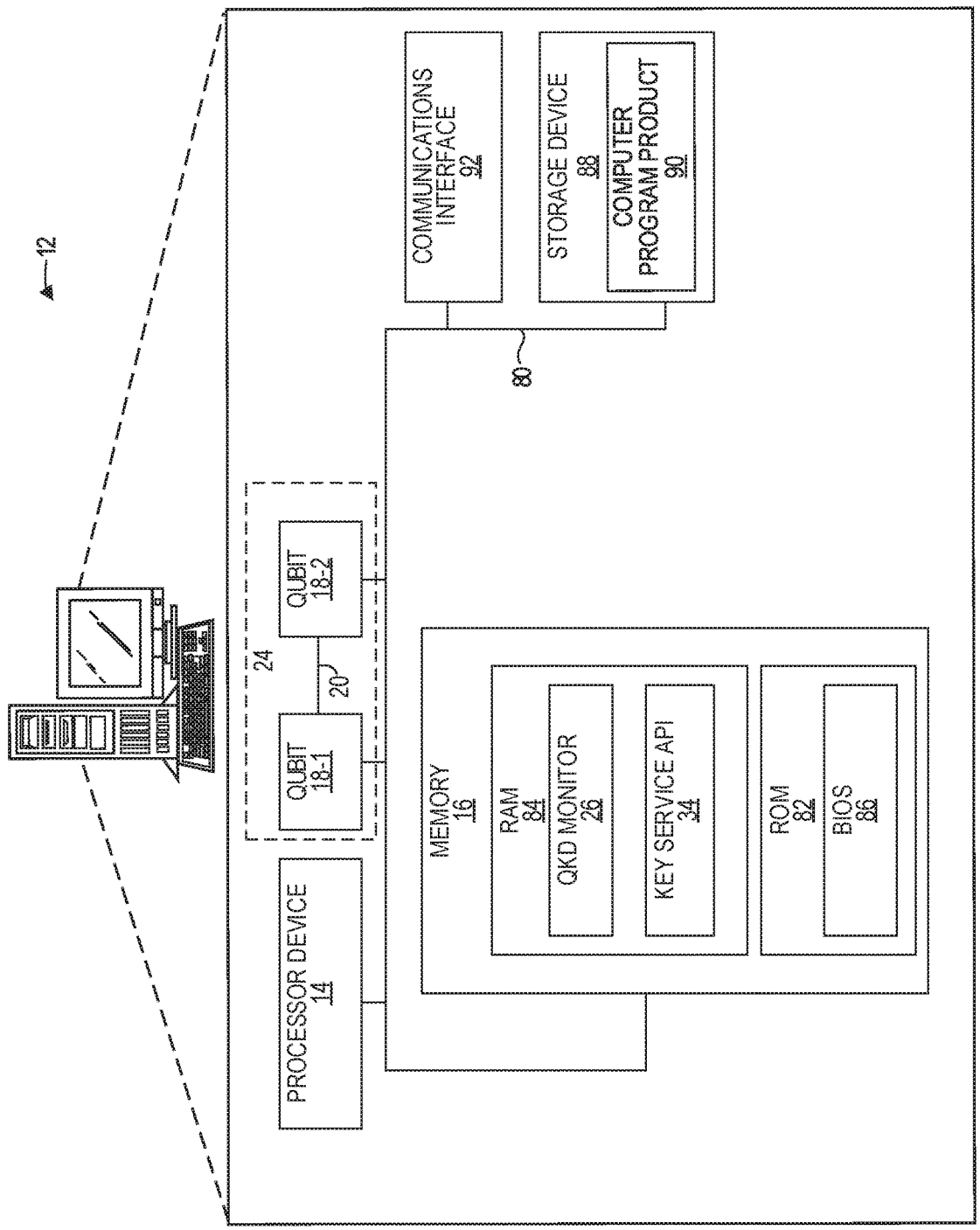
FIG. 9 is a block diagram of a quantum computing system suitable for implementing examples according to one example.

FIG. 9 is a block diagram of the quantum computing system 12 suitable for implementing examples according to one example. All or portions of the quantum computing system 12 may operate at cold temperatures, such as at approximately −273 degrees Celsius. The quantum computing system 12 is capable of operating on quantum information, such as via the qubits 18-1 and 18-2, and also operating on classical binary information. The quantum computing system 12 includes at least one processor device 14, at least one system memory 16, and a system bus 80. The system bus 80 provides an interface for system components including, but not limited to, the system memory 16 and the processor device 14. The processor device 14 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The system memory 16 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the quantum computing system 12. The volatile memory 84 may also include a high-speed RAM, such as static RAM, for caching data.

The quantum computing system 12 further includes at least one quantum communication channel 20 coupled between the two qubits 18-1-18-2. As discussed above, while for purposes of illustration the quantum computing system 12 is depicted at a single location, components of the quantum computing system 12 may be geographically remote from one another.

The quantum computing system 12 may include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like.

A number of modules can be stored in the storage device 88 and in the volatile memory 84, including, by way of non-limiting example, the QKD monitor 26 and the key service API 34, which may implement the functionality described herein in whole or in part.

All or a portion of the examples may be implemented as a computer program product 90 stored on a transitory or non-transitory computer-usable or computer-readable storage medium, such as the storage device 88, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The quantum computing system 12 may also include a communications interface 92 suitable for communicating with the network(s) 38 as appropriate or desired.

Figure 10:
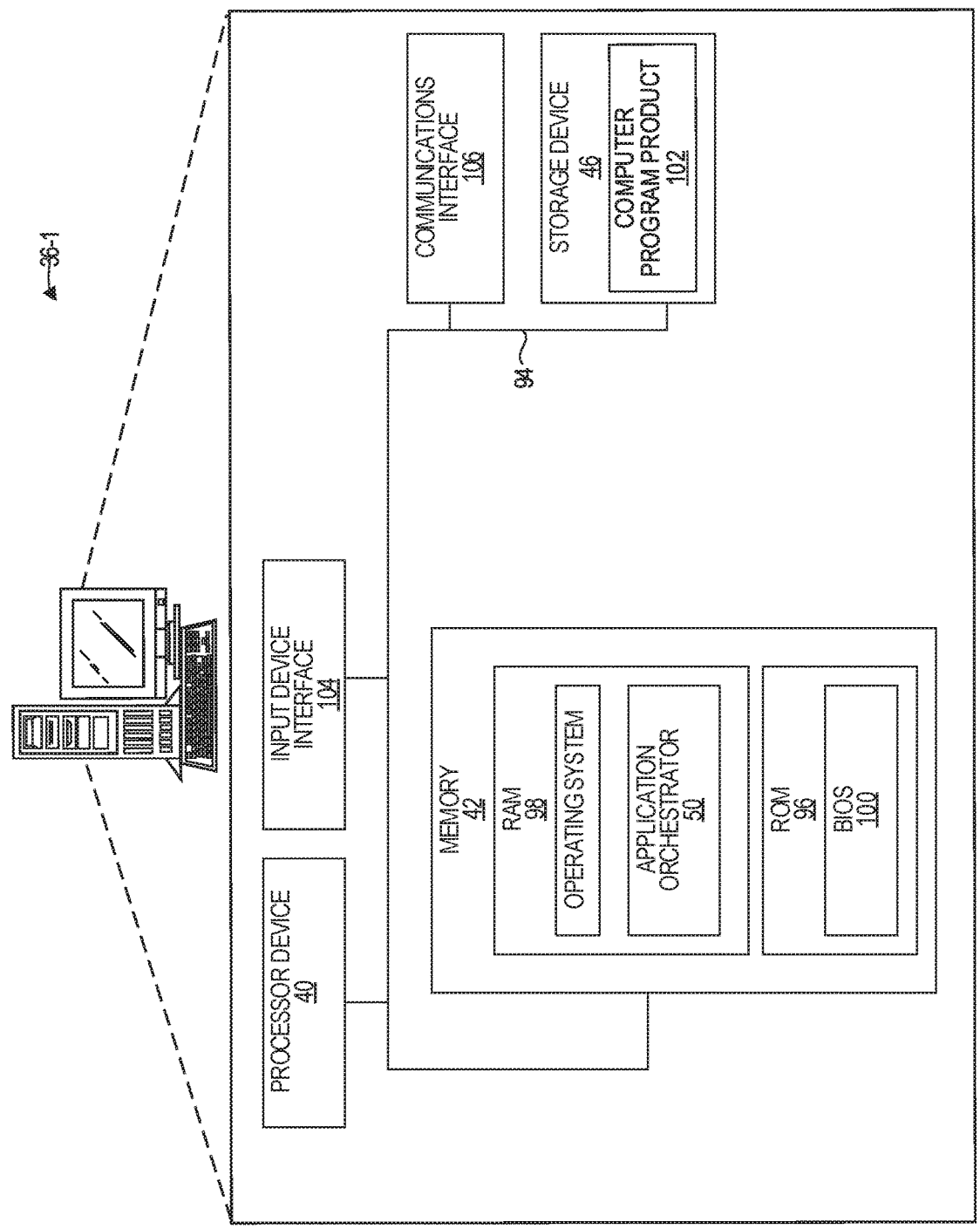
FIG. 10 is a block diagram of the computing device illustrated in FIG. 1 according to one example.

FIG. 10 is a block diagram of the computing device 36-1 suitable for implementing examples according to one example. The computing device 36-1 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 36-1 includes the processor device 40, the system memory 42, and a system bus 94. The system bus 94 provides an interface for system components including, but not limited to, the system memory 42 and the processor device 40. The processor device 40 can be any commercially available or proprietary processor.

The system bus 94 may be any of several types of bus structures that may further interconnect to a memory bus (with or without a memory controller), a peripheral bus, and/or a local bus using any of a variety of commercially available bus architectures. The system memory 42 may include non-volatile memory 96 (e.g., read-only memory (ROM), erasable programmable read-only memory (EPROM), electrically erasable programmable read-only memory (EEPROM), etc.), and volatile memory 98 (e.g., random-access memory (RAM)). A basic input/output system (BIOS) 100 may be stored in the non-volatile memory 96 and can include the basic routines that help to transfer information between elements within the computing device 36-1. The volatile memory 98 may also include a high-speed RAM, such as static RAM, for caching data.

The computing device 36-1 may further include or be coupled to a non-transitory computer-readable storage medium such as the storage device 46, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 46 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 46 and in the volatile memory 98, including an operating system and one or more program modules, such as the application orchestrator 50, which may implement the functionality described herein in whole or in part. It is to be appreciated that the examples can be implemented with various commercially available operating systems or combinations of operating systems.

A number of modules can be stored in the storage device 46 and in the volatile memory 98, including, by way of non-limiting example, the application orchestrator 50. All or a portion of the examples may be implemented as a computer program product 102 stored on a transitory or non-transitory computer-usable or computer-readable storage medium, such as the storage device 46, which includes complex programming instructions, such as complex computer-readable program code, to cause the processor device 40 to carry out the steps described herein. Thus, the computer-readable program code can comprise software instructions for implementing the functionality of the examples described herein when executed on the processor device 40. The processor device 40, in conjunction with the application orchestrator 50 in the volatile memory 98, may serve as a controller, or control system, for the computing device 36-1 that is to implement the functionality described herein.

An operator, such as the user 47, may also be able to enter one or more configuration commands through a keyboard (not illustrated), a pointing device such as a mouse (not illustrated), or a touch-sensitive surface. Such input devices may be connected to the processor device 40 through an input device interface 104 that is coupled to the system bus 94 but can be connected by other interfaces such as a parallel port, an Institute of Electrical and Electronic Engineers (IEEE) 1394 serial port, a Universal Serial Bus (USB) port, an IR interface, and the like.

The computing device 36-1 may also include a communications interface 106 suitable for communicating with the network(s) 38 as appropriate or desired.

Other computer system designs and configurations may also be suitable to implement the systems and methods described herein. The following examples illustrate various additional implementations in accordance with one or more aspects of the disclosure.

Example 1 is a method that includes determining, by an application orchestrator executing on a computing device, that a first application requires a key to execute on the computing device; requesting the key from a quantum computing system; receiving, in response to requesting the key, a message that instructs the application orchestrator to cause the first application to implement a reduced functionality mode of the first application; and inhibiting execution of the first application.

Example 2 is the method of claim 1 wherein the method further includes receiving, by the application orchestrator, a message that instructs the application orchestrator to cause a second application that is executing on the computing device to implement a reduced functionality mode of the second application; and sending, to the second application, a message that instructs the second application to implement the reduced functionality mode of the second application.

Example 3 is the method of example 2 further comprising: accessing, by the application orchestrator, a data structure that includes a plurality of entries, each entry corresponding to a particular application of a plurality of applications configured to execute on the computing device, and each entry identifying a reduced functionality mode for the corresponding application; identifying an entry that corresponds to the second application; and based on the reduced functionality mode identified in the entry, sending, to the second application, the message that instructs the second application to implement the reduced functionality mode of the second application.

Example 4 is the method of example 1 further comprising: accessing, by the application orchestrator, an application dependency structure that identifies dependencies among a plurality of applications, including the first application; determining, based on the application dependency structure, that a second application that is configured to execute on the computing device has a dependency with the first application; and sending, to the second application, a message that instructs the second application to implement the reduced functionality mode of the second application.

Example 5 is a computing device comprising: a memory, and a processor device coupled to the memory, wherein the processor device is to: determine, by an application orchestrator, that a first application requires a key to execute on the computing device; request a key from a quantum computing system; receive, in response to requesting the key, a message that instructs the application orchestrator to cause the first application to implement a reduced functionality mode of the first application; and inhibit execution of the first application.

Example 6 is the computing device of example 5 wherein the processor device is further to access, by the application orchestrator, an application dependency structure that identifies dependencies among a plurality of applications, including the first application; determine, based on the application dependency structure, that a second application that is configured to execute on the computing device has a dependency with the first application; and send, to the second application, a message that instructs the second application to implement the reduced functionality mode of the second application.

Example 7 is the computing device of example 5 wherein the processor device is further to receive, by the application orchestrator, a message that instructs the application orchestrator to cause a second application that is executing on the computing device to implement a reduced functionality mode of the second application; and send, to the second application, a message to implement the reduced functionality mode of the second application.

Example 8 is a computing device comprising a means for determining that a first application requires a key to execute on the computing device; a means for requesting a key from a quantum computing system; a means for receiving, in response to requesting the key, a message that instructs the application orchestrator to cause the first application to implement a reduced functionality mode of the first application; and a means for inhibiting execution of the first application.

Example 9 is a method comprising: requesting, by an application executing on a computing device, a key from a quantum computing system; receiving, in response to requesting the key, a message that instructs the application to implement a reduced functionality mode of the application; and in response to receiving the message, implementing, by the application, the reduced functionality mode.

Example 10 is a computing device comprising: a memory, and a processor device coupled to the memory, wherein the processor device is to request, by an application executing on the computing device, a key from a quantum computing system; receive, in response to requesting the key, a message that instructs the application to implement a reduced functionality mode of the application; and in response to receiving the message, implement, by the application, the reduced functionality mode.

Example 11 is a quantum computing device comprising: a means for receiving a request from a computing device for a key for use with a first application configured to execute on the computing device, the request including information that identifies the application; a means for initiating a quantum key distribution (QKD) process to generate the key in response to the request; a means for determining that an intruder attempted to eavesdrop on the QKD process; and a means for sending a message to a computing device that instructs the computing device to cause the application to implement a reduced functionality mode of the first application.

Example 12 is a quantum computing device comprising: a request receiver that is to receive, from a computing device, a request for a key for use with a first application that is to execute on the computing device, the request including information that identifies the first application; a QKD process initiator that is to initiate a QKD process to generate the key in response to the request received by the request receiver; an intruder detector that is to determine that an intruder attempted to eavesdrop on the QKD process; and a message sender that is to send a message to the computing device that instructs the computing device to cause the first application to implement a reduced functionality mode of the first application.

Example 13 is a quantum computing system, comprising: a memory and a processor device coupled to the memory to: receive, from a computing device, a request for a key for use with a first application configured to execute on the computing device, the request including information that identifies the application; in response to the request, initiate a quantum key distribution (QKD) key generation process to generate the key; determine that an intruder attempted to eavesdrop on the QKD process; and send a message to the computing device that instructs an application orchestrator to cause the first application to implement a reduced functionality mode of the first application; and the computing device comprising: a memory and a processor device coupled to the memory, wherein the processor device is to: determine, by the application orchestrator, that the first application requires the key to execute on the computing device; request the key from the quantum computing system; receive, in response to requesting the key, the message that instructs the application orchestrator to cause the first application to implement a reduced functionality mode of the first application; and inhibit execution of the first application.

Example 14 is the quantum computing system of claim 13 wherein the processor device of the quantum computing system is further to determine that a plurality of computing devices other than the computing device are configured to execute the first application; and send, to each respective computing device of the plurality of computing devices, a message that instructs each respective computing device to cause the first application to implement the reduced functionality mode of the first application.

Example 15 is the quantum computing system of claim 13 wherein the processor device of the quantum computing system is further to access an application dependency structure that identifies dependencies among a plurality of applications, including the first application; determine, based on the application dependency structure, that a second application that is configured to execute on the computing device has a dependency with the first application; and send, to the computing device, a message that instructs the computing device to cause the second application to implement a reduced functionality mode of the second application.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a quantum computing system from a computing device, a request for a key for use with a first application executing on the computing device in a full functionality mode of the first application, the request including information that identifies the first application;
in response to the request, initiating a quantum key distribution (QKD) process associated with the first application to generate the key;
determining that an intruder attempted to eavesdrop on the QKD process;
in response to determining the intruder attempted to eavesdrop on the QKD process associated with the first application, selecting a reduced functionality mode of a plurality of reduced functionality modes based on the first application; and
sending, to the computing device, a message that instructs the computing device to cause the first application to transition from the full functionality mode of the first application to the reduced functionality mode of the first application.

2. The method of claim 1 further comprising determining a type of the reduced functionality mode of the first application by:
accessing a data structure that includes a plurality of entries, each entry corresponding to a particular application of a plurality of applications, and each entry identifying a respective reduced functionality mode for the corresponding application;
identifying an entry that corresponds to the first application; and
based on the reduced functionality mode identified in the entry, sending the message to the computing device that instructs the computing device to cause the first application to transition from the full functionality mode of the first application to the reduced functionality mode of the first application.

3. The method of claim 2 wherein the message instructs the computing device to inhibit execution of the first application.

4. The method of claim 2 wherein the message instructs the computing device to limit functionality of the first application from a read and write functionality mode to a read-only functionality mode.

5. The method of claim 1 further comprising:
accessing, by the quantum computing system, an application dependency structure that identifies dependencies among a plurality of applications, including the first application;
determining, based on the application dependency structure, that a second application that is configured to execute on the computing device has a dependency with the first application; and
sending, to the computing device, a message that instructs the computing device to cause the second application to implement a reduced functionality mode of the second application.

6. The method of claim 5 further comprising:
accessing a data structure that includes a plurality of entries, each entry corresponding to a particular application of the plurality of applications, and each entry identifying a reduced functionality mode for the corresponding application;
identifying a first entry that corresponds to the first application;
based on the reduced functionality mode identified in the first entry, sending, to the computing device, the message that instructs the computing device to cause the first application to transition from the full functionality mode of the first application to the reduced functionality mode of the first application;
identifying a second entry that corresponds to the second application; and
based on the reduced functionality mode identified in the second entry, sending, to the computing device, the message that instructs the computing device to cause the second application to implement the reduced functionality mode of the second application.

7. The method of claim 1 further comprising:
determining that a plurality of computing devices other than the computing device are configured to execute the first application; and
sending, to each respective computing device of the plurality of computing devices, a message that instructs each respective computing device to cause the first application to transition from the full functionality mode of the first application to the reduced functionality mode of the first application.

8. A quantum computing system, comprising:
a memory; and
a processor device coupled to the memory to:
receive, from a computing device, a request for a key for use with a first application executing on the computing device in a full functionality mode of the first application, the request including information that identifies the first application;
in response to the request, initiate a quantum key distribution (QKD) process associated with the first application to generate the key;
determine that an intruder attempted to eavesdrop on the QKD process;
in response to determining the intruder attempted to eavesdrop on the QKD process associated with the first application, select a reduced functionality mode of a plurality of reduced functionality modes based on the first application; and
send, to the computing device, a message that instructs the computing device to cause the first application to transition from the full functionality mode of the first application to the reduced functionality mode of the first application.

9. The quantum computing system of claim 8 wherein the processor device is further to determine a type of the reduced functionality by:
accessing a data structure that includes a plurality of entries, each entry corresponding to a particular application of a plurality of applications, and each entry identifying a respective reduced functionality mode for the corresponding application;
identifying an entry that corresponds to the first application; and
based on the reduced functionality mode identified in the entry, sending the message to the computing device that instructs the computing device to cause the first application to transition from the full functionality mode of the first application to the reduced functionality mode of the first application.

10. The quantum computing system of claim 8 wherein the message instructs the computing device to inhibit execution of the first application.

11. The quantum computing system of claim 8 wherein the message instructs the computing device to limit functionality of the first application from a read and write functionality mode to a read-only functionality mode.

12. The quantum computing system of claim 8 wherein the processor device is further to:
access an application dependency structure that identifies dependencies among a plurality of applications, including the first application;
determine, based on the application dependency structure, that a second application that is configured to execute on the computing device has a dependency with the first application; and
send, to the computing device, a message that instructs the computing device to cause the second application to implement a reduced functionality mode of the second application.

13. The quantum computing system of claim 12 wherein the processor device is further to:
access a data structure that includes a plurality of entries, each entry corresponding to a particular application of the plurality of applications, and each entry identifying a reduced functionality mode for the corresponding application;
identify a first entry that corresponds to the first application;
based on a reduced functionality mode identified in the first entry, send, to the computing device, a message that instructs the computing device to cause the first application to transition from the full functionality mode of the first application to a reduced functionality mode of the first application;
identify a second entry that corresponds to the second application; and
based on the reduced functionality mode identified in the second entry, send, to the computing device, the message that instructs the computing device to cause the second application to implement the reduced functionality mode of the second application.

14. The quantum computing system of claim 8 wherein the processor device is further to:
determine that a plurality of computing devices other than the computing device are configured to execute the first application; and
send, to each respective computing device of the plurality of computing devices, a message that instructs each respective computing device to cause the first application to transition from the full functionality mode of the first application to a reduced functionality mode of the first application.

15. A computer program product stored on a non-transitory computer-readable storage medium and including instructions to cause a processor device to:

receive, by a quantum computing system from a computing device, a request for a key for use with a first application executing on the computing device in a full functionality mode of the first application, the request including information that identifies the first application;
in response to the request, initiate a quantum key distribution (QKD) process associated with the first application to generate the key;
determine that an intruder attempted to eavesdrop on the QKD process;
in response to determining the intruder attempted to eavesdrop on the QKD process associated with the first application, select a reduced functionality mode of a plurality of reduced functionality modes based on the first application; and
send, to the computing device, a message that instructs the computing device to cause the first application to transition from the full functionality mode of the first application to the reduced functionality mode of the first application.

16. The computer program product of claim 15 wherein the instructions further cause the processor device to determine a type of the reduced functionality mode by:
accessing a data structure that includes a plurality of entries, each entry corresponding to a particular application of a plurality of applications, and each entry identifying a respective reduced functionality mode for the corresponding application;
identifying an entry that corresponds to the first application; and
based on the reduced functionality mode identified in the entry, send the message to the computing device that instructs the computing device to cause the first application to transition from the full functionality mode of the first application to the reduced functionality mode of the first application.

17. The computer program product of claim 16 wherein the message instructs the computing device to inhibit execution of the first application.

18. The computer program product of claim 16 wherein the message instructs the computing device to limit functionality of the first application from a read and write functionality mode to a read-only functionality mode.

19. The computer program product of claim 15 wherein the instructions further cause the processor device to:
access, by the quantum computing system, an application dependency structure that identifies dependencies among a plurality of applications, including the first application;
determine, based on the application dependency structure, that a second application that is configured to execute on the computing device has a dependency with the first application; and
send, to the computing device, a message that instructs the computing device to cause the second application to implement a reduced functionality mode of the second application.

20. The computer program product of claim 19 wherein the instructions further cause the processor device to:
access a data structure that includes a plurality of entries, each entry corresponding to a particular application of the plurality of applications, and each entry identifying a reduced functionality mode for the corresponding application;
identify a first entry that corresponds to the first application;

based on the reduced functionality mode identified in the first entry, send, to the computing device, the message that instructs the computing device to cause the first application to transition from the full functionality mode of the first application to the reduced functionality mode of the first application;

identify a second entry that corresponds to the second application; and based on the reduced functionality mode identified in the second entry, send, to the computing device, the message that instructs the computing device to cause the second application to implement the reduced functionality mode of the second application.

\* \* \* \* \*